United States Patent [19]
Tehranian et al.

[11] Patent Number: 5,878,248
[45] Date of Patent: Mar. 2, 1999

[54] DEVICE ACCESS CONTROLLER FOR VIRTUAL VIDEO/KEYBOARD/MOUSE INPUT/OUTPUT FOR REMOTE SYSTEM MANAGEMENT AND MAINTENANCE

[75] Inventors: Michael Tehranian, Boxboro; Brian Martin, Worcester; Michael Giancioppo, Natick; Jonathan Shapiro; Sheldon P. Gringorten, both of Framingham; Paul D. Linton, Lexington, all of Mass.

[73] Assignee: Data General Corporation, Westboro, Mass.

[21] Appl. No.: 661,571

[22] Filed: Jun. 11, 1996

[51] Int. Cl.$^6$ ........................................................ G06F 15/16
[52] U.S. Cl. .......................... 395/502; 395/526; 395/306; 395/200.01
[58] Field of Search ..................................... 395/501–504, 395/509, 511, 515, 516, 520, 526, 200.01, 200.05, 200.09, 200.11, 200.2, 306, 280, 308

[56] References Cited

U.S. PATENT DOCUMENTS

| | | | |
|---|---|---|---|
| 4,757,443 | 7/1988 | Hecker et al. | 345/10 |
| 5,333,259 | 7/1994 | Jung | 395/501 |
| 5,596,729 | 1/1997 | Lester et al. | 395/308 |

*Primary Examiner*—Kee M. Tung
*Attorney, Agent, or Firm*—Gary D. Clapp

[57] ABSTRACT

A device access controller residing in a first computer system for transferring virtual inputs and outputs representing operations of the first system between the first system and a second system. The device access controller includes a video controller for performing video display operations, a video memory for storing video data representing operations of the first system, a network controller for transferring information between the first system and the second system, a controller processor, and a device access controller bus interconnecting the video controller, the network controller and the processor. A video interface is connected between the first system bus and the device access controller bus for receiving video information including video data and video write addresses from the first system bus and into the video memory and controller and the controller processor and network controller are responsive to the writing of video data into the video memory for reading the video information including the video data from the video memory and the video data write addresses from the video controller registers and transmitting the video information including the video data and the video data write addresses to the second system. The device access controller further includes a keyboard interface, a disk interface, and a serial interface operating in manners generally analogous to the video interface for corresponding communicating corresponding data between the first and second systems.

11 Claims, 10 Drawing Sheets

HOST ISA MEMORY ASSIGNMENTS

| MEMORY ADDRESS | DESCRIPTION |
|---|---|
| A0000-BFFFF | VIDEO BUFFER |
| XXXXX-YYYYY | SHARED MEMORY SPACE |

FIG. 4

HOST ISA I/O PORT ASSIGNMENTS

| PORT ADDRESS | DESCRIPTION |
|---|---|
| 2F8-2FF | COM PORT 2* |
| 3B0-3DF | VIDEO CONTROL & ATTRIBUTES |
| 3F0-3F7 | FLOPPY CONTROL |
| 3F8-3F7 | COM PORT 1* |
| ???-??? | DAC INTERRUPT PORT |
| ???-??? | DAC SHARED MEMORY CONTROL/CONFIGURATION |
| *THE DAC VIRTUAL SERIAL /O PORT CAN BE ASSIGNED TO EITHER COM1 OR COM2. | |

FIG. 5

HOST ISA INTERRUPT ASSIGNMENTS

| INTERRUPT | DESCRIPTION |
|---|---|
| IRQ3 | COM PORT 2* |
| IRQ4 | COM PORT 1* |
| IRQ6 | FLOPPY CONTROLLER |
| *THE DAC VIRTUAL SERIAL/O PORT CAN BE ASSIGNED TO EITHER COM1 OR COM2. | |

FIG. 6

DAC BUS INTERRUPTS

| INTERRUT LEVEL | |
|---|---|
| NMI | "NO POWER/BATTERY DEAD" |
| SMI* | |
| INT0 | REAL TIME CLOCK |
| INT1 | LAN |
| INT2 | VIDEO REDIRECTION |
| INT3 | ALL OTHER REDIRECTION |
| INT4 | DEV/DAC "ATTENTION" |
| INT5 | I$^2$C BUS |
| INT6 | JTAG? |
| INT7 | |

FIG. 7

DAC SIDEBAND SIGNAL DESCRIPTION

| SIGNAL | TYPE | DESCRIPTION | HOBBES |
|---|---|---|---|
| KYBD_DAT | I/O | KEYBOARD DATA SIGNAL TO/FROM 8742 KEYBOARD CONTROLLER. | N |
| KYBD_CK | I/O | KEYBOARD CLOCK SIGNAL TO/FROM 8742 KEYBOARD CONTROLLER. | N |
| MOUSE_DAT | I/O | MOUSE DATA SIGNAL TO/FROM 8742 KEYBOARD CONTROLLER. | N |
| MOUSE_CK | I/O | MOUSE CLOCK SIGNAL TO/FROM 8742 KEYBOARD CONTROLLER. | N |
| HOST_RESET | I/O | FORCE A HOST RESET VIA POWER_GOOD SIGNAL. SENSE???WHY NOT PWR_GOOD | |
| NMI | O | FORCE A NODE NON_MASKABLE INTRRUT. | Y |
| SMI_N | O | FORCE A NODE SERVER MANAGEMENT INTRRUT. ACTIVE LOW. | Y |
| I2C_BUS_INT_N | I/O | I2C BUS INTERRUT. ACTIVE LOW. | |
| I2C_CLK | I/O | I2C BUS CLOCK. | Y |
| I2C_DAT | I/O | I2C BUS DATA. | Y |
| TDO | O | JTAG TDO ???UPDATA FROM JTAG ARCH SPEC | |
| TDI0 | I | JTAG TDI | |
| TDI1 | I | JTAG TDI | |
| TCK | O | JTAG TEST CLOCK | |
| TMS0 | O | JTAG TMS | |
| TMS1 | O | JTAG TMS | |
| TMS2 | O | JTAG TMS | |
| TMS3 | I/O | JTAG TMS | |
| TMS4 | I/O | JTAG TMS | |
| TMS5 | I/O | JTAG TMS | |
| TRST_N | O | JTAG RESET. ACTIVE LOW. | |
| PROC_RST | I | PROCESSOR RESET FOR MONITORING. | |
| IO_RST | I | I/O MOTHERBOARD RESET FOR MONITORING. | |

FIG. 8A

SIDEBAND CONNECTOR PINOUT

| PIN | SIGNAL | PIN | SIGNAL | PIN | SIGNAL |
|---|---|---|---|---|---|
| 1 | KYBD_DAT | 15 | GND | 29 | TMS1 |
| 2 | GND | 16 | I2C_CLK | 30 | TMS2 |
| 3 | KYBD_CK | 17 | GND | 31 | TMS3 |
| 4 | GND | 18 | I2C_DAT | 32 | TMS4 |
| 5 | MOUSE_DAT | 19 | GND | 33 | TMS5 |
| 6 | GND | 20 | TDO | 34 | TRST_N |
| 7 | MOUSE_CK | 21 | GND | 35 | GND |
| 8 | GND | 22 | TD10 | 36 | PROC_RST |
| 9 | HOST_RESET | 23 | GND | 37 | GND |
| 10 | GND | 24 | TD11 | 38 | IO_RST |
| 11 | NMI | 25 | GND | 39 | |
| 12 | SMI_N | 26 | TCK | 40 | |
| 13 | GND | 27 | GND | | |
| 14 | I2C_BUS_INT_N | 28 | TMS0 | | |

FIG. 8B

ISA REGISTER MODEL

| ADDR | ACCESS | NAME | DESCRIPTION |
|------|--------|------|-------------|
| 03?0 | R | SRA | STATUS REGISTER A |
| 03?1 | RW | SRB | STATUS REGISTER B |
| 03?2 | RW | DOR | DIGITAL OUTPUT REGISTER |
| 03?3 | RW | TDR | TAPE DRIVE REGISTER |
| 03?4 | R | MSR | MAIN STATUS REGISTER |
| 03?4 | W | DSR | DATA RATE SELECT REGISTER |
| 03?5 | R/W | FIFO | COMMAND/DATA REGISTER |
| 03?6 | X | | RESERVED |
| 03?7 | R | DIR | DIGITAL INPUT REGISTER |
| 03?7 | W | CCR | CONFIGURATION CONTROL REGISTER |

FIG. 9

ISA REGISTER BIT DEFINITIONS

| REGISTER | BIT 7 | BIT 6 | BIT 5 | BIT 4 | BIT 3 | BIT 2 | BIT 1 | BIT 0 |
|----------|-------|-------|-------|-------|-------|-------|-------|-------|
| SRA | INT_PD | DRV2# | STEP | TRKO# | HDSEL | INDX# | WP# | DIR |
| SRB | 1 | 1 | DR_SLO | WD_TG | RD_TG | WE | MTEN1 | MTEN2 |
| DOR | MTEN3 | MTEN2 | MTEN1 | MTEN0 | DMGT# | RST# | DR_SL1 | DR_SL2 |
| TDR | – | – | – | – | – | – | TP_SL1 | TP_SL0 |
| MSR | RQM | DIO | N_DMA | CD_BS | D3_BS | D2_BS | D1_BS | D0_BS |
| DSR | SW_RS | P_DWN | PDOSC | PCMP2 | PCMP1 | PCMP0 | DRAT1 | DRAT0 |
| FIFO | cd7 | cd6 | cd5 | cd4 | cd3 | cd2 | cd1 | cd0 |
| DIR | D_CHG | IDLE | PD | IDMSK | 1 | DRAT1 | DRAT0 | HDNS# |
| CCR | – | – | – | IDMSK | – | – | DRAT1 | DRAT0 |

FIG. 10

82078 COMMAND SUMMARY

| COMMAND CODE* | COMMAND | COMMAND CODE | COMMAND |
|---------------|---------|--------------|---------|
| 0x000010 (8/0/7) | READ TRACK | 00010010 (1/0/0) | PERPENDICULAR MODE |
| 00000011 (2/0/0) | SPECIFY | x0010011 (3/0/0) | CONFIGURE |
| 00000100 (1/0/1) | SENSE DRIVE STATUS | x0010100 (0/0/1) | LOCK |
| xx000101 (8/0/7) | WRITE DATA | xxx10110 (8/0/7) | VERIFY |
| xxx00110 (8/0/8) | READ DATA | 00010111 (1/0/1) | POWERDOWN MODE |
| 00000111 (1/0/0) | RECALIBRATE | 00011000 (0/0/1) | PART ID |
| xx001001 (8/0/7) | WRITE DELETED DATA | xxx11001 (8/0/7) | SCAN LOW OR EQUAL |
| 0x001010 (1/0/7) | READ ID | xxx11101 (8/0/7) | SCAN HIGH OR EQUAL |
| xxx01100 (8/0/7) | READ DELETED DATA | 00101110 (0/0/16) | SAVE |
| 0x001101 (5/4n/7) | FORMAT TRACK | 00110011 (1/0/0) | OPTION |
| 00001110 (0/0/10) | DUMP REGISTER | 01001110 (0/0/16) | RESTORE |
| 00001111 (2/0/0) | SEEK | 10001110 (1–5/0/4) | DRIVE SPECIFICATION |
| 00010000 (0/0/1) | VERSION | 1x001111 (2/0/0) | RELATIVE SEEK |
| 00010000 (0/0/2) | SENSE INTERRUPT STATUS | 1x101101 (5/n/7) | FORMAT AND WRITE |
| xxx10001 (8/0/7) | SCAN EQUAL | | |

FIG. 11

CONTROL WORD 1 (FIRST BYTE EVERY MONITORED TRANSFER)

| BIT NO. | NAME | DESCRIPTION |
|---|---|---|
| 7 | PAGE HIT | M/IO AND ADDRESS BIT 15-5 ARE THE SAME AS THE LAST ACCESS:NO FURTHER CONTROL |
| 6 | R/W | DIRECTION OF TRANSFER. |
| 5 | SBHE* | BYTE HIGH ENABLE, USED WITH ADDR[0] TO INDICATE 8/16 BIT TRANSFERS. |
| 4-0 | ADDR[4:0] | 32 BYTE PAGE OFFSET. |

FIG. 12

CONTROL WORD 2 (SECOND BYTE OF TRANSFER IF "PAGE HIT" FALSE)

| BIT NO. | NAME | DESCRIPTION |
|---|---|---|
| 7-5 | ADDR[7:5] | ADDRESS BITS 7 THROUGH 5 |
| 4-1 | UNDEFINED | |
| 0 | M/IO | |

FIG. 13

| CONTROL WORD 3 (THIRD BYTE OF TRANSFER IF "PAGE HIT" FALSE) |||
|---|---|---|
| BIT NO. | NAME | DESCRIPTION |
| 7-0 | ADDR[15:8] | ADDRESS BITS 15 THROUGH 8 |

FIG. 14

| KEYBOARD/MOUSE REGISTER SUMMARY |||
|---|---|---|
| ADDRESS | NAME | DESCRIPTION |
| xxxx | HBUF1 | HOST TO KEYBOARD DATA |
| xxxx | DBUF1 | KEYBOARD TO HOST DATA |
| xxxx | HBUF2 | HOST TO MOUSE DATA |
| xxxx | DBUF2 | MOUSE TO HOST DATA |

FIG. 15

| KEYBOARD/MOUSE FLAG SUMMARY ||||
|---|---|---|---|
| CSR BIT POS. | NAME | SET CONDITION | CLEAR CONDITION |
| xxxx | HBRDY1 | HOST/KEYBOARD OUTPUT | 386EX READ OF HBUF1 |
| xxxx | HBIEN1 | 386EX WRITE | 386EX WRITE |
| xxxx | HBRDY2 | HOST/MOUSE OUTPUT | 386EX READ OF HBUF2 |
| xxxx | HBIEN2 | 386EX WRITE | 386EX WRITE |

FIG. 16

ISA REGISTER MODEL

| ADDR | MAME | BIT7 | BIT6 | BIT5 | BIT4 | BIT3 | BIT2 | BIT1 | BIT0 |
|---|---|---|---|---|---|---|---|---|---|
| xxx0:0 | RX_BUF | D7 | D6 | D5 | D4 | D3 | D2 | D1 | D0 |
| xxx0:1 | DLL | DL7 | DL6 | DL5 | DL4 | DL3 | DL2 | DL1 | DL0 |
| xxx1:0 | IER | 0 | 0 | 0 | 0 | EDSSI | ELSI | ETBEL | ERB |
| xxx1:0 | DLM | DL15 | DL14 | DL13 | DL12 | DL11 | DL10 | DL9 | DL8 |
| xxx2 | IIR | F_ENB | F_ENB | 0 | 0 | INTID2 | INTID1 | INTID0 | IPND* |
| xxx2 | FCR | RTRG1 | RTRG0 | RSV | RSV | D_MD | TFRST | RFRST | F_ENB |
| xxx3 | LCR | DLAB | S_BRK | ST_PR | EPS | PEN | STB | WLSI | WLS0 |
| xxx4 | MCR | 0 | 0 | 0 | LOOP | OUT2 | OUT1 | RTS | DTR |

FIG. 17

RTRG DEFINITIOM OF FCR

| RTRG1 | RTRG0 | RECEIVE FIFO TRIGGER LEVEL |
|---|---|---|
| 0 | 0 | 1 BYTE |
| 0 | 1 | 4 BYTE |
| 1 | 0 | 8 BYTE |
| 1 | 1 | 14 BYTE |

FIG. 18

DAC SERIAL REGISTERS

| ADDRESS | NAME | DESCRIPTION |
|---|---|---|
| xxx0 | RX_BUF | TRANSMITTER BUFFER |
| xxx1 | IER | INTERRUPT ENABLE REGISTER |
| xxx2 | IIR | INTERRUPT IDENT. REGISTER |
| xxx3 | LCR | LINE CONTROL REGISTER |
| xxx4 | MCR | MODEM CONTROL REGISTER |
| xxx5 | LSR | LINE STATUS REGISTER |
| xxx6 | MSR | MODEM STATUS REGISTER |
| xxx7 | SCR | SCRATCH REGISTER |
| xxx8 | DLL | DIVISOR LATCH (LSB) |
| xxx9 | DLM | LATCH (MSB) |
| xxxA | SD_ADDR | SERIAL RECEIVE ADDRESS POINTER |
| xxxB | SD_LNGHT | SERIAL RECEIVE COUNTER |
| xxxB | SD_MB | SERIAL MAILBOX REGISTER |

FIG. 19

SERIAL FLAG SUMMARY

| CSR BIT POS. | NAME | SET CONDITION | CLEAR CONDITION |
|---|---|---|---|
| xxxx | SDBSY | COUNT TO 0 OR TC | 386EX WRITE |
| xxxx | SDIEN | 386EX WRITE | 386EX WRITE |
| xxxx | SDDONE | COUNT TO 0 | 386EX WRITE |
| xxxx | SDNIEN | 386EX WRITE | 386EX WRITE |

FIG. 20

DEVICE ACCESS CONTROLLER FOR VIRTUAL VIDEO/KEYBOARD/MOUSE INPUT/OUTPUT FOR REMOTE SYSTEM MANAGEMENT AND MAINTENANCE

CROSS REFERENCES TO RELATED APPLICATIONS

Field of the Invention

The present invention relates to a device access controller for maintenance and management of a data processing system and, in particular, for a device access controller providing virtual video, keyboard and mouse input and output to and from a data processing system for remote management and maintenance of a data processing system.

Background of the Invention

The development of increasingly more powerful microprocessors and larger and progressively less costly memories has resulted in microprocessor based systems, originally developed as "personal computers", that approach or, in some instances, equal the speed and power of many mainframe and supermini computers. This has, in turn, led to the development of microprocessor based systems and servers in replacement of conventional mainframe and minicomputer based systems and servers.

Such microprocessor based systems are generally constructed of industry standard components, or at least widely accepted and thereby effectively standard components, interconnected by industry standard buses and executing commonly and widely accepted operating systems and application programs. A typical microprocessor based system of server, for example, will comprise one or more microprocessors, such as Intel Pentium™ microprocessors, and one or more memory units constructed of industry standard memory chips. The system or server will further include a video input/output unit, a keyboard/mouse input/output unit, one or more hard and/or floppy disk drives with controllers, various PROMs for storing BIOS and boot programs, and one or more communications controllers, all meeting industry standard functional specifications. The components will be interconnected by one or more industry standard buses, such as the ISA bus, the EISA bus or the X-Bus, and the system or server will execute one or more of the widely accepted operating systems, such as Microsoft DOS™ or Windows™, OS/2™ or one of the UNIX family of operating systems, and the compatible and widely accepted applications programs. This commonality of components, operating systems and applications programs results, in turn, an additional advantage over mainframe systems and minicomputers in that microprocessor based systems are usually significantly less costly than equivalent mainframe systems of minicomputer systems of equivalent power and performing the same functions.

A recurring problem with microprocessor based systems, however, is that the use of microprocessor based systems in place of mainframe or minicomputer systems, for example, as servers, brings with it the requirement to offer reliability, availability and system maintenance capabilities equivalent to those offered by mainframe and minicomputer based systems. In the past, however, microprocessor based systems have been designed as stand-alone, single user systems, that is, personal computers, with system management maintenance capabilities provided through the usual user interface, that is, a keyboard and display, and perhaps a mouse, connected directly into the system through the usual video drivers and keyboard/mouse circuits. The use of microprocessor based systems in place of mainframe or minicomputer systems, however, generally requires at least the capability of remote maintenance and system management and, preferably, the capability to maintain and manage a system comprised of several interconnected and interoperative personal computers rather than a single processor/memory system. It is also preferable that the system maintenance and management facility be such as to allow a single remote site to maintain and manage a plurality of such systems.

Remote maintenance and management facilities were and are relatively common and expected in mainframe and minicomputer based systems, whose architectures are generally designed specifically to accommodate remote maintenance and management. Microprocessor based systems, however, evolved without such considerations and, as a consequence, the architectures of microprocessor based systems do not readily lend themselves to remote maintenance and management.

The problem is further compounded in that it is preferable that such remote maintenance and management facilities be transparent to the existing standardized, or at least widely accepted, architectures, both for reasons of backwards compatibility with existing systems and to maintain what is effectively an industry wide standardization of many of the components of such systems. For example, the addition of remote maintenance and management capabilities should require no changes to the standardized and operating systems widely used in microprocessor based systems or, for example, the BIOS programs of the systems, which generally also conform to industry wide conventions, although remote maintenance and management programs may be added to the systems. It is therefore preferable that such additions to microprocessor based systems that are necessary to provide remote maintenance and management capabilities be implemented within the hardware components of the systems and transparent to the software components of the systems. The problem is compounded, however, in that the hardware components from which microprocessor based systems are usually constructed are effectively standardized and are thereby commonly interoperative with all other functionally related components of the systems. The basic functionality of the hardware components should therefore not be altered in adding a remote maintenance and management capability or the advantage of commonality and interoperability with other standardized components will be lost. The problem is still further compounded, however, in that while the buses interconnecting the components are standardized, the arrangement and interconnection of the components on the buses is not standardized and may vary widely.

Previous methods of providing remote system maintenance and monitoring, however, have generally been applied only to mainframe or minicomputer systems and have involved hardware, firmware or software components customized to a particular system, or hardware, firmware or software modifications of the systems. While these approaches of the prior art were acceptable for mainframe or minicomputer systems, since such systems were essentially proprietary and particular to individual manufacturers and therefore had no standardized characteristics, these approaches are unsuitable and undesirable for microprocessor based systems for the reasons discussed above.

In addition, the approaches of the prior art generally used "snooping" or "screen grabbing" from the system buses or video controllers wherein snooping requires hardware or software monitoring of the system buses or controllers for video traffic and capture of the video traffic for transmittal to a remote site. Screen grabbing, in turn, uses system bus mastering and other techniques to periodically scan the system video controller for video information that is then transmitted to a remote site. Besides requiring significant modifications to the system hardware or software, as described above, snooping and screen grabbing disrupt the normal operation of the system, thereby requiring further modifications to the system, that is, adaptation of the normal operations of the system to accommodate snooping or screen grabbing, and interfere with the very operations that are being observed.

The present invention provides a solution to these and other problems of the prior art.

SUMMARY OF THE INVENTION

The present invention is directed to a device access controller residing in a first computer system for transferring virtual inputs and outputs representing operations of the first system between the first system and a second system.

According to the present invention, the device access controller includes a video controller for performing video display operations, a video memory connected from the video controller for storing video data representing operations of the first system, a network controller connected to the second system by a network for transferring information between the first system and the second system, a controller processor for controlling operations of the device access controller, and a device access controller bus interconnecting the video controller, the network controller and the processor. A video interface is connected between the first system bus and the device access controller bus and is responsive to a first system video data write operation on the first system bus for receiving video information including video data and video write addresses from the first system bus and indicating the first system video write operation to the controller processor. The controller processor is, in turn, responsive to the indication of the first system video write operation for directing the video controller to write the received video data write addresses into video controller registers and the video data into the video memory at the video write addresses. The network controller is then responsive to the writing of video data into the video memory for reading the video information including the video data from the video memory and the video data write addresses from the video controller registers and transmitting the video information including the video data and the video data write addresses to the second system.

The video interface is further responsive to a first system video data read operation on the first system bus for receiving video information including the video data read addresses from the first system bus and indicating the first system video data read operation to the controller processor. The controller processor us then responsive to the indication of the first system video data read operation for directing the video controller to write the received video data read addresses into the video controller registers, and the network controller being responsive to the writing of video data read addresses into the video controller registers for reading the video information including the data read addresses from the video controller registers and transmitting the video information including the video data read addresses to the second system.

In a presently preferred embodiment, the network controller communicates information to and from the second system in network packets and the device access controller further includes a device access controller memory connected from the device access controller bus. Upon a video write or read operation, the network controller reads the video information into the device access controller memory, formats the video information in the device access controller memory into network packets stored therein, and transmits the network packets to the second system, reversing the process to receive video information from the second system.

In further embodiments of the present invention, the device access controller further includes a keyboard interface connected to the device access controller bus and to a keyboard controller of the first system. The network controller is then responsive to keyboard information received from the second system for indicating to the controller processor the receipt of information from the second system. The controller processor is in turn responsive to the received keyboard information for directing the network controller to write the keyboard information to the keyboard interface, and the keyboard interface is responsive to the keyboard information received from the network controller for providing the keyboard information to the keyboard controller of the first system to appear as keyboard information received directly by the first system from a local keyboard.

In a yet further embodiment of the present invention, the device access controller further includes a disk interface connected between the first system bus and the device access controller bus and responsive to a first system disk write operation on the first system bus for receiving first disk information including disk data and disk write addresses from the first system bus and indicating the first system disk write operation to the controller processor. Again, the controller processor is responsive to the indication of the first system disk write operation to write the first disk information into the device access controller memory and to direct the network controller to read the first disk information from the device access controller memory and transmit the first disk information to the second system.

In a like manner, the disk interface is responsive to a first system disk read operation on the first system bus for receiving second disk information including disk read addresses from the first system bus and indicating the first system disk read operation to the controller processor. The controller processor is responsive to the indication of the first system disk read operation for writing the second disk information into a device access controller memory, and directing the network controller to read the second disk information from the device access controller memory and transmit the second disk information to the second system. In this instance, the second system is then responsive to the disk read addresses for transmitting third disk information including the disk data corresponding to the disk read addresses to the network controller. The network controller is then responsive to the third disk information received from the second system for indicating the receipt of the third disk information, and the controller processor is responsive to the indication of receipt of the third disk information for directing the network controller to provide the third disk information to the disk interface and directing the disk interface to provide the third disk information to the first system.

In still further embodiment, the device access controller further includes an address mapping interface connected between the controller processor and the video interface for mapping between first system addresses appearing on the first system bus and device access controller bus addresses and an interrupt mapping interface connected between the controller processor and the first system bus for mapping between interrupts appearing on the first system bus and the device access controller bus.

DESCRIPTION OF THE DRAWINGS

The foregoing and other objects, features and advantages of the present invention will be apparent from the following description of the invention and embodiments thereof, as illustrated in the accompanying figures, wherein:

FIG. 4 is a diagrammatic representation of external memory assignments in the device access controller;

FIG. 5 is a diagrammatic representation of external port assignments in the device access controller;

FIG. 6 is a diagrammatic representation of external interrupt assignments in the device access controller;

FIG. 7 is a diagrammatic representation of internal interrupt assignments in the device access controller;

FIGS. 8A and 8B are sideband connection signals of the device access controller;

FIG. 9 is a diagrammatic representation of registers emulated by the device access controller;

FIG. 10 is a diagrammatic representation of bit assignments in the registers emulated by the device access controller;

FIG. 11 is a diagrammatic representation of commands of the device access controller;

FIGS. 12, 13 and 14 are diagrammatic representations of control words transferred by the device access controller;

FIGS. 15 and 16 are diagrammatic representations of registers and flags of the device access controller for keyboard and mouse operations;

FIG. 17 is a diagrammatic representation of serial input/output registers emulated by the device access controller;

FIG. 18 is a diagrammatic representation of the operation of a FIFO controller for serial input/output emulated by the device access controller;

FIG. 19 is a diagrammatic representation of serial input/output registers emulated by the device access controller; and, FIG. 20 is a diagrammatic representation of serial input/output control flags emulated by the device access controller.

DESCRIPTION OF THE INVENTION

Figure 1:
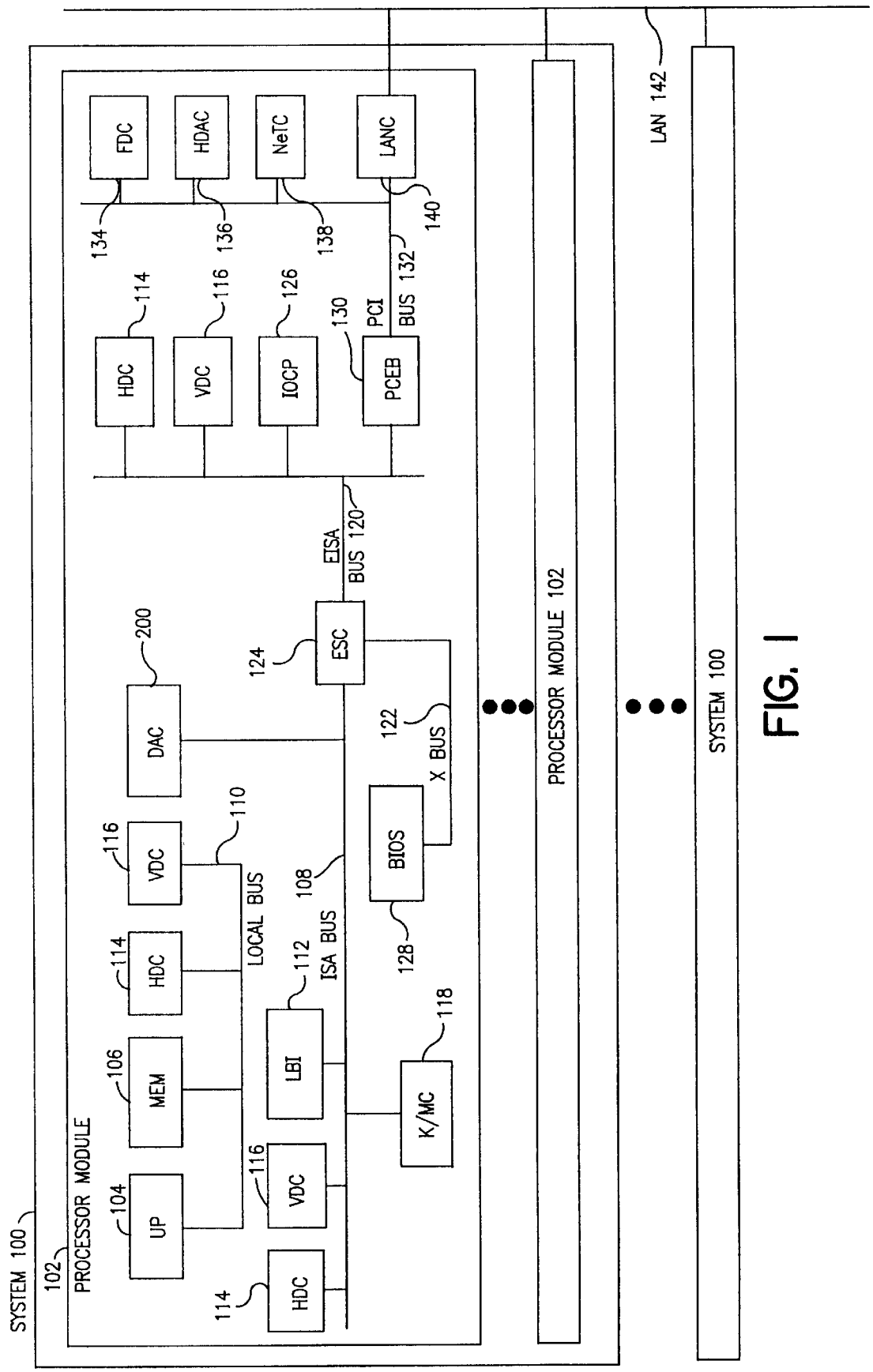
FIG. 1 is a diagrammatic representation of a multiprocessor system incorporating the present invention.

A. General Description and Discussion of a Microprocessor Based System (FIG. 1)

The following will first provide a general description of the structure and operation of a system incorporating the present invention, and a device access controller of the present invention, and will the provide more detailed descriptions of each of the functions and operations peformed by a device access controller of the present invention, including the components performing each function or operation. It will be noted that the following descriptions follow the convention wherein elements referred to the the text are identified in the text and in the drawings by three or four digit reference numbers. The leftmost digit or two digits identify the number of the drawing that an element first appears in while the two rightmost digits are assigned in the sequence in which the elements are discussed. For example, all elements referred to by reference numbers 100 through 199 first appear in FIG. 1, all elements identified by reference numbers 200 through 299 first appear in FIG. 2, and so on, while element 100 is the first element discussed with regard to FIG. 1, 102 the second, and so on. It will be apparent, therefore, that certain reference numbers out of each sequence for a given Figure are not used.

Referring to FIG. 1, therein is shown a general block diagram of an exemplary System 100 incorporating the present invention. As illustrated therein, System 100 may include one or more Processor Modules (PM) 102, an exemplary one of which is illustrated in block diagram form in FIG. 1.

As illustrated in the example of FIG. 1, a Processor Module (PM) 102 is comprised of one or more Microprocessors (uPs) 104, such as Intel Pentium™ or P6 microprocessors, and one or more Memories (MEMs) 106 for storing operating system and applications programs for controlling operations of the Processor Module (PM) 102. Assuming, for purposes of illustation, a single Microprocessor (uP) 104 and Memory (MEM) 106, each Microprocessor (uP) 104 and Memory (MEM) 106 may be connected directly to an internal system bus, such as an ISA Bus 108 conforming to ?, or to a high speed, high capacity Local Bus 110 which in turn is connected to ISA Bus 108 through a Local Bus Interface (LBI) 112. In the latter implementation, certain devices which exchange large volumes of data with Microprocessor (uP) 104 or Memory (MEM) 106, such as a Hard Disk Controller (HDC) 114 or a Video Display Controller (VDC) 116, are connected from Local Bus 110 to exchange data directly with Microprocessor (uP) 104 and Memory (MEM) 106, the higher data transfer rates available through Local Bus 110 thereby significantly enhancing the speed of operation of the system. In other implementations, such devices as Hard Disk Controller (HDC) 114 and Video Display Controller (VDC) 116 may be connected from ISA Bus 108, as may such devices as a Keyboard/Mouse Controller (K/MC) 118. In still other implementations, these and other devices may be connected from yet other system buses or in other ways, as will be described below.

ISA Bus 108 is often interconnected with further system buses, each of which is optimized for certain types of operations. For example, ISA Bus 108 may be connected to a Extended ISA (EISA) Bus 120, conforming to ?, and to an X Bus 122, conforming to ?, through a bridge circuit generally referred to as an EISA System Component (ESC) 124. EISA Bus 120, in turn, may connect to such devices as Hard Disk Controllers (HDCs) 114, Video Display Controllers (VDCs) 116, and Input/Output Communications Ports (IOCP) 126 while X Bus 122 connects to such devices as a Bios Memory (BIOS) 128 for storing the system's Basic Input/Output System programs, generally referred to as the system BIOS.

EISA Bus 120, in turn, may be connected through a Personal Computer Entended Bus interface (PCEB) 130 to a Personal Computer Interconnect (PCI) Bus 132 conforming to ?, which in turn may connect to such devices as a Floppy Disk Controller (FDC) 134, a Hard Disk Array Controller (HDAC) 136 or a Network Communication Controller (NetC) 138. PCI Bus 132 may further be connected through a Local Area Network Controller (LANC) 140 to a Local Area Network Bus (LAN) 142 to other Processor Modules (PMs) 102 of System 100, and one or more System 100s may be further interconnected through LAN 140.

Finally, PCI Bus 130 may be connected through a PCI Bridge (PCIB) 144 to still further buses, such as a SCSI Bus 146 conforming to ?, connecting to such devices as further disk controllers, printers and so on.

In summary, therefore, as illustrated above and as well understood in the relevant arts, microprocessor based systems are generally implemented using effectively standardized components interconnected through standardized buses. For example, most microprocessor based systems use microprocessors and memory components selected from a relatively limited and commonly available and widely used family of such components, such as Intel 86xxx and Pentium™ families of microprocessors or the Motorola 68xxx family of microprocessors. Other system components, such as displays, disk drives, communications controllers, keyboards and mouse devices and their associated standardized controllers, drivers and interface units are similarly selected from relatively limited, commonly available and widely used families of such components, most of which are designed to widely accepted standards. In addition, and as briefly illustrated above, the buses through which the components are interconnected, and thus the signals and protocols executed on the buses, are similarly standardized, examples of such being the ISA, EISA, X, and PCI buses discussed above, all of which are accepted as industry standard buses and which conform to accepted industry standards.

It is also apparent, however, as is also well understood in the relevant arts, that the ways in which these standardized components may be interconnected may vary widely from system to system. For example, it has been illustrated above that in a given system the video display controller may be connected to either ISA Bus 108 or a Local Bus 110, As a consequence, and while a remote maintenance and management capability should preferably be implemented in the hardware of a microprocessor based system, and transparent to the system's operating system and BIOS, any generally applicable means for providing remote maintenance and management in microprocessor based systems must also be independent of the specific interconnections and arrangements of the system components and buses.

B. Device Access Controller for Remote Maintenance and Management

As has been briefly discussed above, all access to typical microprocessor based systems, for maintenance and management as well as use, has traditionally been through the video display, keyboard and mouse, the video display providing visual displays of all operations of the system and the keyboard and mouse providing inputs controlling all operations of the system. Therefore, and as a consequence, while the video display controller and the mouse/keyboard controller may be connected at any of a number of locations in a microprocessor based system, the data outputs and inputs necessary for remote maintenance and management are always available in the video display controller and in the keyboard/mouse controller.

According to the present invention, therefore, a device access controller for providing remote maintenance and management is implemented as a video display controller that functions transparently to the system programs and other hardware components as a standard video display controller but which provides the additional functionality required for remote maintenance and management of the system.

1. General Description of a Device Access Controller (FIG. 1)

Figure 2:
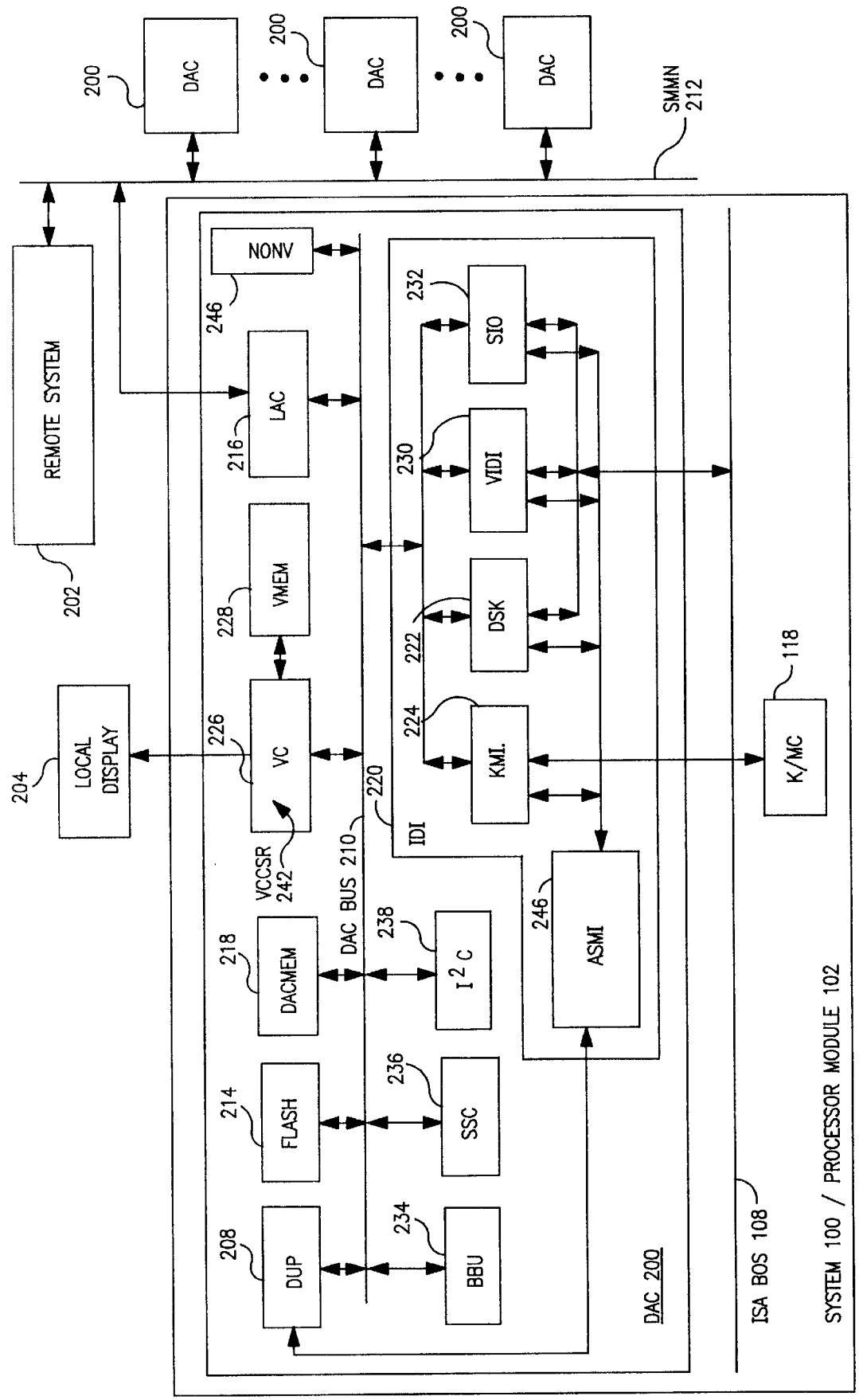
FIG. 2 is a block diagram of a device access controller of the present invention.

Referring to FIG. 2, therein is shown a block diagram of a Device Access Controller (DAC) 200 according to the present invention. As represented therein, the Device Access Controller (DAC) 200 is connected to a system bus in place of a standard Video Display Controller (VDC) 116 and, although illustrated as connected to ISA Bus 108, may be connected to any system bus to which the standard Video Display Controller (VDC) 116 would normally be connected in the System 100 to which the remote maintenance and management capability is being added.

As will be described below, Device Access Controller (DAC) 200 performs all normal video display functions for the Processor Module (PM) 102 in which it resides, that is, its host Processor Module (PM) 102, as well a redirecting video display information from the Processor Module (PM) 102 to a Remote System 202 that provides maintenance and system management support and functions to Systems 100 and Processor Modules (PM)s 102. Device Access Controller (DAC) 200 also provides keyboard/mouse inputs from Remote System 202 to the Processor Module (PM) 102 as would a keyboard and mouse connected directly to Processor Module (PM) 102 or System 100. For this purpose, Device Access Controller (DAC) 200 provides a video output to the Remote System 202 and to a local Local Display 204, if present, and receives keyboard and mouse inputs from the Remote System 202, and provides the keyboard and mouse inputs to a Keyboard/Mouse Controller 206 of the Processor Module (PM) 102, which is usually but not necessarily located on the Processor Module (PM) 102 motherboard.

Device Access Controller (DAC) 200 also emulates a floppy disk drive, so that Remote System 202 appears as a "virtual disk drive" connected to the system bus, provides a virtual serial data input/output port connecting Processor Module (PM) 102 to an external source and destination of serial data, monitors System 100 power, fans, temperature and so on, and stores and executes System 100 diagnostic and test programs.

As illustrated in FIG. 2, Device Access Controller (DAC) 200 is a microprocessor based controller based on a Device Access Controller Microprocessor (DuP) 208, such as an Intel 386EX processor will all components of Device Access Controller (DAC) 200 being interconnected through a Device Access Controller (DAC) Bus 210, which is a standard bus compatible with Device Access Controller Microprocessor (DuP) 208, such as the Intel 386 bus with its associated interrupt and control lines. Device Access Controller Microprocessor (DuP) 208 controls the operations of the Device Access Controller (DAC) 200 and operates under control of operating system and BIOS programs stored in a Flash Memory (Flash) 214 connected from DAC Bus 210 and which is, for example, a 2M×8 Flash EEPROM. Flash Memory (Flash) 214 also operates to store the current state of operation of Processor Module (PM) 102 or System 100 and Device Access Controller (DAC) 200 should System 100 enter battery backup operation upon a power failure or system shut-down, in the usual manner well understood in the relevant arts. Flash Memory (Flash) 214 is also used to store diagnostic and test programs for the Processor Module (PM) 102 or the System 100, again in the manner well known in the relevant arts.

As indicated above, there are three primary forms of data exchanged between Device Access Controller (DAC) 200 and Remote System 202, which are video data, keyboard/mouse data, and emulated floppy disk data. The video data, keyboard/mouse data and emulated floppy data is communicated between Device Access Controller (DAC) 200 and Remote System 202 through any of a plurality of communications connections, such as a Local Area Network (LAN)

allowing one or more Device Access Controllers (DACs) 200, for example, in different Systems 100 or within different Processor Modules (PMs) 102 in a System 100 to communicate with and be controlled by one or more Remote Systems 202.

In the present implementation, for example, communication between Device Access Controller (DAC) 200 and Remote System 202 is through a System Management and Maintenance Network (SMMN) 212, for exampl, a single cable Ethernet such as 10base2 Ethernet, also referred to as "Cheapernet", and Device Access Controller (DAC) 200 includes a LAN Controller (LAC) 216 connected from DAC Bus 210. LAN Controller (LAC) 216 is correspondingly comprised, for example, of a National Semiconductor SONIC™ controller and Coax Transceiver Interface, which includes support logic, an IEEE 802.3 Encoder/Decoder (ENDEC), receive and transmit FIFOs and timers, with the connection between LAN Controller (LAC) 216 and the Ethernet cable being through a BNC connector mounted on the Device Access Controller (DAC) 200 circuit card.

Communication of video, keyboard/mouse and floppy disk data between a Device Access Controller (DAC) 200 and Remote System 202 will generally be asynchronous with the operations of System 100 and will be in the form of "packets" as required by the specific communication link between Device Access Controller (DAC) 200 and Remote System 202, as well understood by those of skill in the relevant arts. For this reason, in part, Device Access Controller (DAC) 200 further includes a Device Access Controller Memory (DACMEM) 218 connected from DAC Bus 210 for storing video data to be communicated to Remote System 202 and keyboard/mouse inputs received Remote System 202, as well as emulated floppy disk data received from and to be sent to Remote System 202. As will be described further below with regard to each type of data, LAN Controller (LAC) 216 utilizes a portion of Device Access Controller Memory (DACMEM) 218 as a packet buffer for storing video data to be transmitted to Remote System 202. The video data is stored in the form Ethernet "packets" that are organized and managed by linked lists constructed by LAN Controller (LAC) 216 and also stored in Device Access Controller Memory (DACMEM) 218. The keyboard/mouse inputs received from Remote System 202 are received by LAN Controller (LAC) 216 as Ethernet packets and are similarly stored in Device Access Controller Memory (DACMEM) 218 by LAN Controller (LAC) 216 as Ethernet packets organized by linked lists. Device Access Controller Memory (DACMEM) 218 is also used for other storage purposes as required, and is used as a general memory by DAC Microprocessor (DuP) 208.

2. Redirection of Floppy Disk Data (FIG. 2)

As described briefly above, Device Access Controller (DAC) 200 emulates a floppy disk drive with respect to Processor Module (PM) 102 and, from the viewpoint of Processor Module (PM) 102, floppy disk data is provided to and received from Processor Module (PM) 102 through the Processor Module (PM) 102 bus Device Access Controller (DAC) 200 is connected to, such as ISA Bus 108, in a conventional manner. The floppy disk data, however, is re-directed to and from Remote System 202 by Device Access Controller (DAC) 200, which thereby requires the bidirectional reading and writing of floppy disk data between ISA Bus 108 and Remote System 202 through Device Access Controller (DAC) 200.

As shown in FIG. 2, Device Access Controller (DAC) 200 includes an ISA/DAC Interface (IDI) 220 connected between ISA Bus 108 and DAC Bus 210 that functions as the general and primary interface between Device Access Controller (DAC) 200 and Processor Module (PM) 102, and thus between Device Access Controller (DAC) 200 and System 100. As represented in FIG. 2, ISA/DAC Interface (IDI) 220 includes, in part, a Disk Emulator (DSK) 222 that operates to emulate a standard floppy disk controller with respect to ISA Bus 108.

When floppy disk data is received from Remote System 202 by LAN Controller (LAC) 216, LAN Controller (LAC) 216 takes control of DAC Bus 210, by asserting an interrupt in the usual manner, and, using an internal interruptable direct memory access (DMA) controller, stores the data in Device Access Controller Memory (DACMEM) 218 by LAN Controller (LAC) 216 as Ethernet "packets" organized by linked lists, as described above, and notifies DAC Microprocessor (DuP) 208 that floppy disk data has been received into Device Access Controller Memory (DACMEM) 218 by setting a flag. DAC Microprocessor (DuP) 208 will then assume control of DAC Bus 210, and thus of Device Access Controller Memory (DACMEM) 218, and will read the floppy disk data from Device Access Controller Memory (DACMEM) 218 to ISA/DAC Interface (IDI) 220, using the linked lists to order the reading of data. Disk Emulator (DSK) 222 in ISA/DAC Interface (IDI) 220 will receive the data and, emulating a floppy disk with respect to ISA Bus 108, will write the floppy disk data onto ISA Bus 108 to the selected destination.

The writing of floppy disk data from System 100 to Remote System 202 follows the same paths and sequence of steps, but in the reverse order, with Disk Emulator (DSK) 222 issuing a redirection interrupt for DAC Bus 210 when a floppy write operation is initiated by the Processor Module (PM) 102. DAC Microprocessor (DuP) 208 responds by writing the floppy data into DAC Memory (DACMEM) 218 and notifying LAN Controller (LAC) 216 that data to be transmitted resides in DAC Memory (DACMEM) 218. LAN Controller (LAC) 216 responds by organizing the floppy data into Ethernet packets, with an associated linked list, and subsequently transmits the floppy data to Remote System 202.

3. Redirection of Keyboard/Mouse Data (FIG. 2)

The keyboard and mouse signals provided from Remote System 202 to Device Access Controller (DAC) 200 and thus to System 100 are unidirectional from Remote System 202 to Device Access Controller (DAC) 200 because the keystrokes and mouse inputs provided from Remote System 202, the responses of Processor Module (PM) 102 to the remote keystrokes and mouse inputs, and to any locally entered keystrokes and mouse inputs, are represented in the video data sent from Processor Module (PM) 102 to Remote System 202. Communication between Device Access Controller (DAC) 200 and System 100, however, is bidirectional as the responses of Processor Module (PM) 102 to the keystrokes and mouse inputs from Remote System 202, however, are returned to Device Access Controller (DAC) 200, as is usual with a keyboard and mouse device, to control the transfer of keyboard and mouse data from Device Access Controller (DAC) 200 to System 100.

The keystrokes and mouse inputs transmitted from Remote System 202 to System 100 are again received by LAN Controller (LAC) 216 as Ethernet "packets". Upon receiving keystrokes and mouse inputs from Remote System 202, LAN Controller (LAC) 216 takes control of DAC Bus 210, by asserting an interrupt in the usual manner, and, using its internal interruptable direct memory access (DMA) controller, stores the keystroke/mouse data in Device Access Controller Memory (DACMEM) 218 as Ethernet "packets"

organized by linked lists, as described above. LAN Controller (LAC) 216 notifies DAC Microprocessor (DuP) 208 that keystroke/mouse data has been received into Device Access Controller Memory (DACMEM) 218 by setting a flag and DAC Microprocessor (DuP) 208 reads the keystrokes and mouse inputs from Device Access Controller Memory (DACMEM) 218 and provides the keystrokes and mouse inputs to a Keyboard/Mouse Controller (K/MC) 220 in ISA/DAC Interface (IDI) 220. Keyboard/Mouse Interface 224 in turn operates as a virtual keyboard/mouse device and provides the keystrokes and mouse inputs to a Keyboard/Mouse Controller (K/MC) 118 in the same manner as from a local keyboard or mouse device. It should be noted that, in a typical implementation, the keystrokes and mouse inputs are not written onto ISA Bus 108 but instead are provided to Keyboard/Mouse Controller (K/MC) 118 by direct wire connection through a separate connector as the inputs to Keyboard/Mouse Controller (K/MC) 118 are typically through a cable from a keyboard or mouse device, rather than from ISA Bus 108.

4. Redirection of Video Information (FIG. 2)

Referring now to the redirection of video data, Device Access Controller (DAC) 200 includes a Video Controller (VC) 226, such as a Cirrus CL-CD5429 VGA controller, and a Video Memory (VMEM) 228, such as a 256K×16, fast page, dual CAS DRAM, operating in the same manner as a conventional Video Display Controller (VDC) 116 to receive, store, provide and manage video data. Device Access Controller (DAC) 200 is thereby fully compatible with the video data related operations of all conventional programs and operations executing on a Processor Module (PM) 102. For example, Device Access Controller (DAC) 200 uses the registers and frame buffers provided by Video Controller (VC) 226 and Video Memory (VMEM) 228 to support video read and write access operations of the Processor Module (PM) 102 in the same manner as a conventional Video Controller (VDC) 116, so that Device Access Controller (DAC) 200 is fully compatible with all conventional video related programs and operations of System 100. Also, and again because Device Access Controller (DAC) 200 is fully compatible with and operates in the same manner as a Video Controller (VDC) 116, Device Access Controller (DAC) 200 may be connected into a Processor Module (PM) 102 or System 100 at the same locations normally occupied by a Video Controller (VDC) 116, for example, on an ISA Bus 108 or a Local Bus 110. As a consequence, the Device Access Controller (DAC) 200 of the present invention eliminates the need for modifications to System 100's operating system and applications programs or hardware to support video redirection, is completely transparent to normal video related operations of System 100 and all conventional System 100 programs, and requires lower video processing overhead while providing higher video bandwidth.

Now considering the redirection of video information to a Remote System 202, in a typical system Processor Module 202 both writes video information, that is, video data for display and information related to video operations, into Video Memory (VMEM) 228 and the registers of Video Controller (VC) 226 and reads video information from Video Memory (VMEM) 228 and Video Controller (VC) 226 for use by the Processor Module (PM) 102 in certain operations. It is therefore necessary to provide Remote System 202 with video information representing both the writes to and the reads from Video Memory (VMEM) 228 and Video Controller (VC) 226 in order to completely and accurately reflect the operations of a Processor Module (PM) 102 in Remote System 202.

According to the present invention, however, it not necessary to redirect to Remote System 202 any video information read from Video Memory (VMEM) 228 or Video Controller (VC) 226 by System 100 in order to accurately reflect the video operations of a Processor Module (PM) 102 in the Remote System 202 so long as the video information written into Video Memory (VMEM) 228 and Video Controller (VC) 226 has been redirected to Remote System 202. That is, and if this requirement is met, complete copies of all video information written into Video Memory (VMEM) 228 or Video Controller (VC) 226 reside in Remote System 202, that is, will have been redirected, or copied, to Remote System 202 at the time it was written into Video Memory (VMEM) 228 or Video Controller (VC) 226. As a consequence, and according to the present invention, all reads of video information from Video Memory (VMEM) 228 or Video Controller (VC) 226 are completely and accurately represented in Remote System 202 by redirecting only the read addresses to Remote System 202 to identify, through the copies residing in Remote System 202, the video information read from Video Memory (VMEM) 228 or Video Controller (VC) 226.

As has been described previously, all information redirected from a Processor Module (PM) 102 to a Remote System 202 is transmitted in the form of Ethernet "packets" through LAN Controller (LAC) 216, which uses Device Access Controller Memory (DACMEM) 218 as packet buffer. First considering a write of video information to Video Memory (VMEM) 228 or Video Controller (VC) 226 by a Processor Module (PM) 102, the write is detected by a Video Interface 230 in ISA/DAC Interface (IDI) 220. Video Interface 230 then issues a video interrupt to take control of DAC Bus 210 and writes the video information, which may include the addresses of registers in Video Controller (VC) 226 or locations in Video Memory (VMEM) 228 and information to be written into the Video Controller (VC) 226 registers or video data to be written into Video Memory or any combination thereof, into Video Controller (VC) 226 and Video Memory (VMEM) 228 through DAC Bus 210 as necessary. As will be discussed further below, the locations and contents of all registers in Video Controller (VC) 226 and of all locations in Video Memory (VMEM) 228 are mirrored in Device Access Controller Memory (DACMEM) 218, so that all information written into Video Controller (VC) 226 or Video Memory (VMEM) 228 is also copied into Device Access Controller Memory (DACMEM) 218 at the end of the write into Video Memory (VMEM) 228 and/or Video Controller (VC) 226 and, effectively, as part of the same operation.

DAC Microprocessor (DuP) 208 then notifies LAN Controller (LAC) 216 that data to be transmitted to Remote System 202 is present in Device Access Controller Memory (DACMEM) 218, and LAN Controller (LAC) 216 responds by forming the video information into Ethernet packets with an associated linked list and transmitting the packets to Remote System 202.

When Processor Module (PM) 102 performs a read from Video Controller (VC) 226 or Video Memory (VMEM) 228, the read is detected by Video Interface 230 and Video Interface 230 again issues a video interrupt to take control of DAC Bus 210, issues the commands to Video Controller (VC) 226 to read the information from Video Controller (VC) 226 or Video Memory (VMEM) 228, and provides the information to Processor Module (PM) 102, that is, onto the ISA Bus 108 or Local Bus 110. In this instance, however, the information read from Video Controller (VC) 226 or Video Memory (VMEM) 228 is not written into Device Access Controller Memory (DACMEM) 218, and instead only the addresses issued by Video Interface 230 of the registers in Video Controller (VC) 226 or the locations in Video Memory (VMEM) 228 from which the information is read are written into Device Access Controller Memory (DACMEM) 218 at the end of the read from Video Memory (VMEM) 228 and/or Video Controller (VC) 226 and, again, effectively as part of the same operation.

DAC Microprocessor (DuP) 208 then again notifies LAN Controller (LAC) 216 that information is present to be transmitted to Remote System 202, and LAN Controller (LAC) 216 reads the read addresses in Device Access Controller Memory (DACMEM) 218, forms the Ethernet packets and associated linked list, if necessary, and transmits the information to Remote System 202.

Finally, it will be noted in FIG. 2 that Video Controller (VC) 226 is further provided with a conventional video output to a Local Display 204 so that a display may be connected to Device Access Controller (DAC) 200, if desirable, for local display of video data directly from Processor Module (PM) 102 or System 100.

5. Serial Input/Output (I/O) Emulation (FIG. 2)

Finally, ISA/DAC Interface (IDI) 220 includes a Serial Input/Output Emulator (SIO) 232 connected from the Processor Module (PM) 102 bus that Device Access Controller (DAC) 200 is connected from, either an ISA Bus 108 or a Local Bus 110, and providing a virtual input/output port supporting 8 and 16 bit serial data transfers in emulation of a conventional personal computer type COM1 or COM 2 port. This virtual input/output port may be assigned as either Processor Module (PM) 102's COM1 port or COM2 port and appears to Processor Module (PM) 102 as a conventional COM1 or COM2 port.

6. Other Functions of Device Access Controller (DAC) 200 (FIG. 2)

As has been briefly described, in addition to the above described functions Device Access Controller (DAC) 200 also monitors Processor Module (PM) 102 and System 100 power, fans, temperature and so on, and stores and executes System 100 diagnostic and test programs stored in Flash Memory (Flash) 214 or loaded from Remote System 202.

For these reasons, Device Access Controller (DAC) 200 further includes a Battery Backup Unit (BBU) 234 for providing power to Device Access Controller (DAC) 200 in the event of power failure, a System Scan Controller (SSC) 236 which monitors the state of System 100's power supplies, fans and so forth, and an I$^2$C Controller (I$^2$C) 238 monitoring temperature and other parameters of System 100. System status information generated by this components of Device Access Controller (DAC) 200 are transmitted to Remote System 202 in the same manner, for example, as floppy disk data. That is, if System Scan Controller (SSC) 236 or I$^2$C (I$^2$C) Controller 238 detects a status, event or condition to report to Remote System 202, the controller will issue an interrupt on DAC Bus 210 and DAC Microprocessor (DuP) 208 will respond by storing the reported status, event or condition in Device Access Controller Memory (DACMEM) 218 and notifying LAN Controller (LAC) 216 that data is present to be transmitted to Remote System 200. LAN Controller (LAC) 216 will package the data into Ethernet packets and transmit the packets to Remote System 202 in the manner previously described.

7. Address Mapping (FIGS. 2, 3, 4 and 5)

Figure 3:
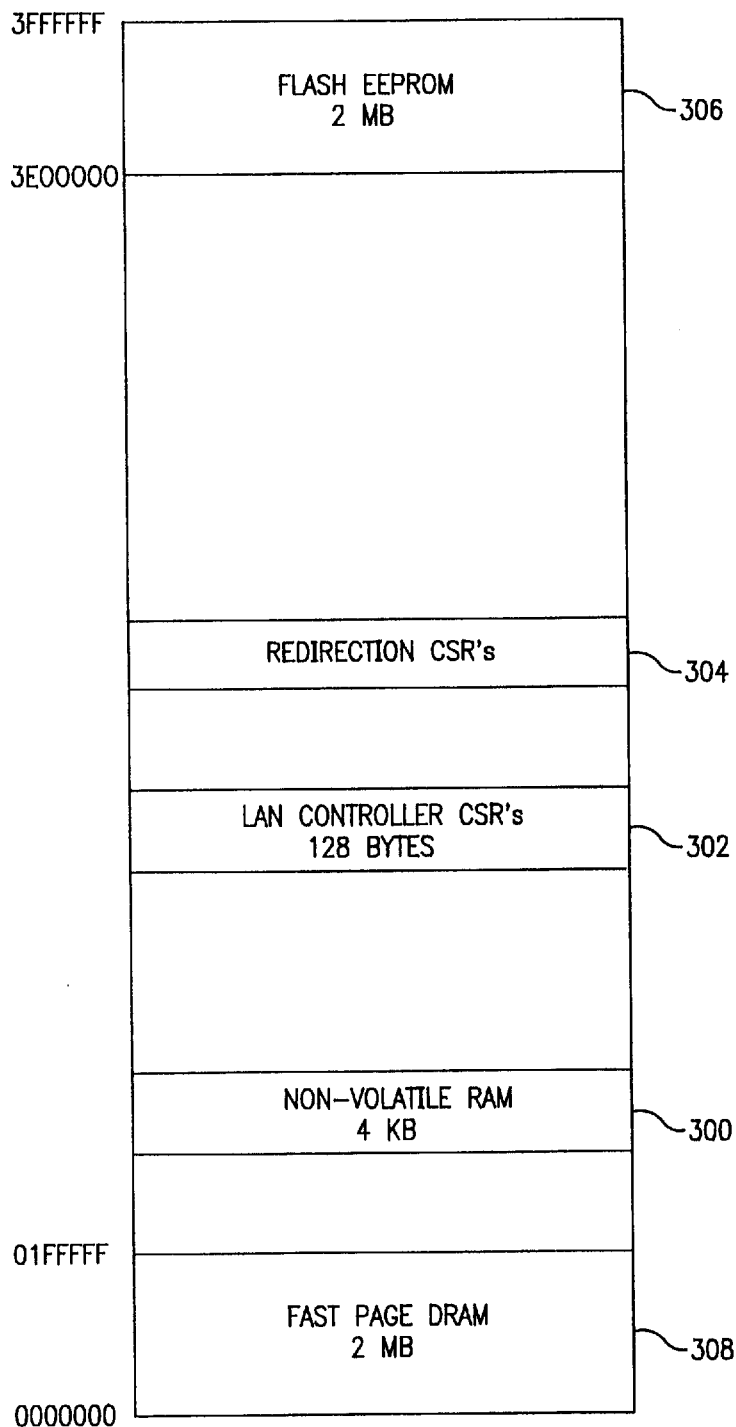
FIG. 3 is a diagrammatic representation of the address space of the device access controller.

It will be apparent to those of ordinary skill in the relevant arts that Device Access Controller Memory (DACMEM) 218 and the memory/registers spaces of other devices connected from DAC Bus 210, such as DAC Microprocessor (DuP) 208, Video Controller (VC) 226 and Video Memory (VMEM) 228, will effectively form a local address space that is separate from the address space of Processor Module (PM) 102 and System 100. The address assignments within Device Access Controller (DAC) 200's internal address space of the devices connected to DAC Bus 210, including Flash Memory (Flash) 214, Device Access Controller Memory (DACMEM) 218, a Non-Volatile Memory 240 used to store, for example, boot programs, the Video Controller (VC) 226's Control and Status Registers (VCCSRs) 242, and Redirection Control and Status Registers (Redirection CSRs) 244 used in controlling the redirection of, for example, video information and floppy disk data, are illustrated in FIG. 3.

FIG. 4, in turn, illustrates the memory space address assignments of certain Device Access Controller (DAC) 200 elements with respect to the address space of Processor Module (PM) 102 while FIG. 5 illustrates the address assignments of I/O ports within the address space of Processor Module (PM) 102, assuming in this example that Device Access Controller (DAC) 200 is connected from an ISA Bus 208.

Therefore, and because Processor Module (PM) 102 has no knowledge of the internal address space or assignments of Device Access Controller (DAC) 200, and the reverse, it is necessary to map the internal address space of Device Access Controller (DAC) 200 into the address space of Processor Module (PM) 102, that is, to translate addresses between the two address spaces.

For this reason, ISA/DAC Interface (IDI) 220 includes a Addressing and Shared Memory Interface (ASMI) 246 that is used and shared by Disk Emulator (DSK) 222, Keyboard/Mouse Interface 224, Video Interface 230, the virtual input/outport provided by Serial I/O Emulator (SIO) 232, and DAC Microprocessor (DuP) 208 to map between addresses on DAC Bus 210 and the Processor Module (PM) 102 bus to which Device Access Controller (DAC) 200 is connected, such as an ISA Bus 108 or a Local Bus 110. There are a number of implementations of Addressing and Shared Memory Interface 240 well known to those of ordinary skill in the relevant arts and any of the commonly known implementations of this function may be used. For example, Addressing and Shared Memory Interface (ASMI) 246 may include a memory for storing one or more address offsets, each relating an address or range of addresses on DAC Bus 210 to a corresponding address or range of addresses on the ISA Bus 108 or Local Bus 110, or the reverse, with the offset being added to or subtracted from an address on one bus to obtain the corresponding address on the other bus. Another approach is generally similar, but stores base address pointers that are added to an address on one bus, or a portion of that address, to obtain the corresponding address with respect to the other bus.

Referring again to FIGS. 3 and 4, it will be noted that Addressing and Shared Memory Interface (ASMI) 246 additionally maps a portion of Device Access Controller Memory (DACMEM) 218's address space on DAC Bus 210 onto Processor Module 202's address space on ISA Bus 108. This mapping of the same memory space into the two address spaces thereby allows Device Access Controller (DAC) 200 and Processor Module (PM) 102 to access, use and share a portion of the same physical memory, such as Device Access Controller Memory (DACMEM) 218, for the purposes, for example, of message and data passing between Device Access Controller (DAC) 200 and Processor Module 202.

8. Interrupts (FIGS. 6 and 7)

As has been described, both Processor Module (PM) 102 and Device Access Controller (DAC) 200 are, in many aspects, conventional microprocessor based systems and, as such, initiate and control certain operation through the exchange of conventional interrupts, while others or controlled through flags, messages, or command words or instructions communicated, for example, through ISA Bus 108 or DAC Bus 210. Examples of the interrupts of Processor Module (PM) 102 and of Device Access Controller (DAC) 200 that are of particular interest with respect to the structure and operation of Device Access Controller (DAC) 200 are indicated in FIGS. 6 and 7 wherein FIG. 6 illustrates the essential interrupts executed between Processor Module (PM) 102 and Device Access Controller (DAC) 200 and FIG. 7 illustrates the Device Access Controller (DAC) 200's internal interrupts, that is, the interrupts exchanged between elements connected from DAC Bus 210.

9. Device Access Controller (DAC) 200 Inputs and Outputs (FIG. 8)

It has been described above that Device Access Controller (DAC) 200 is provided with a network connection, that is, the input/output of LAN Controller (LAC) 216, to a network connecting to a Remote System 202, a video output from Video Controller (VC) 226 to a local Local Display 204, and an output from Keyboard/Mouse Controller (K/MC) 118 to a Keyboard/Mouse Controller (K/MC) 118, as well as the connections to System 100 for monitoring power, temperature, and so on. Except for the input/output connection of LAN Controller (LAC) 216 to the network, which is generally by a coaxial connector and cable, these signals and connections, generally referred to as "sideband" signals, are generally provided through connectors other than the standard bus connectors, such as ribbon cables and connectors, and are summarized in FIG. 8.

Device Access Controller (DAC) 200's input and outputs also include the conventional addresses, data and commands exchanged with the Processor Module (PM) 102 and System 100 bus that Device Access Controller (DAC) 200 is connected to through ISA/DAC Interface (IDI) 220, such as ISA Bus 208, as well as the interrupt inputs/outputs to Processor Module (PM) 102 and System 100, described just above.

10. Further Details of ISA/DAC Interface (IDI) 220

As described, ISA/DAC Interface (IDI) 220 provides an interface between DAC Bus 210 and Processor Module (PM) 102's ISA Bus 108, or a Local Bus 110, and emulates a standard floppy disk drive interface, a video display, keyboard and mouse devices, and serial communications services. ISA/DAC Interface (IDI) 220 is also one of the three devices in Device Access Controller (DAC) 200 that serves as a DAC Bus 210 master, together with DAC Microprocessor (DuP) 208 and LAN Controller (LAC) 216. It is therefore apparent that ISA/DAC Interface (IDI) 220 is a primary functional interface between Device Access Controller (DAC) 200 and System 100, that is, Processor Module (PM) 102.

In a presently preferred embodiment of ISA/DAC Interface (IDI) 220, ISA/DAC Interface (IDI) 220 is constructed from configurable logic circuits, such as a XILINX 4010 20×20 array of configurable logic blocks have the equivalent of approximately 10,000 logic gates, but may be implemented in other ways, as is well understood by those of ordinary skill in the relevant arts. As such, ISA/DAC Interface (IDI) 220 is best described in terms of the functions performed by ISA/DAC Interface (IDI) 220 and the input and output signals and commands thereof Certain of these functions and input and output signals and commands have been described herein above, and further description of the functions, signals and commands will be described in the following, so that an ISA/DAC Interface (IDI) 220 may thereby be readily implemented by any of ordinary skill in the relevant arts.

A. Overview of ISA/DAC Interface (IDI) 220

As has been described above, ISA/DAC Interface (IDI) 220 operates as an ISA Bus 108 or Local Bus 110 slave unit to the host processor, that is, a Processor Module (PM) 102 of System 100. In this function, and assuming that ISA/DAC Interface (IDI) 220 is connected to an ISA Bus 108, ISA/DAC Interface (IDI) 220 contains or emulates an 82078 type floppy disk controller at ISA addresses 3F0-3F7h and 370-377h, a VGA video controller, such as a Cirrus Logic CL-GD5429, at ISA address ?-?h, and a type 16550 Serial Interface at ISA addresses ?-?h and a keyboard and mouse with connections provided as described with reference to FIG. 8. ISA/DAC Interface (IDI) 220 further includes a 2 megabyte Device Access Controller Memory (DACMEM) 218 at ISA addresses ?-?h, a Non-Volatile Memory 240 at ISA addresses ?-?h, and a set of DAC Control and Status Registers, such as Video Controller (VC) 226's Control and Status Registers (VCCSRs) 242 and Redirection Control and Status Registers (Redirection CSRs) 244 at ISA addresses ?-?h.

B. Floppy Disk Emulation and Redirection (FIGS. 9, 10 and 11)

In a presently preferred implementation of the floppy disk emulation and redirection provided by Device Access Controller (DAC) 200, DAC Microprocessor (DuP) 208 and Disk Emulator (DSK) 222 in ISA/DAC Interface (IDI) 220 emulate a 82078 type floppy disk controller in the IBM personal computer PS/2 mode at the ISA Bus 108 addresses identified above.

When operating as a floppy disk emulator, DAC Microprocessor (DuP) 208 and Disk Emulator (DSK) 222 in ISA/DAC Interface (IDI) 220 appear to Processor Module (PM) 102 and System 100 as several control and status registers, a command/data FIFO memory, an interrupt source, and a direct memory access (DMA) data source. The registers emulated by DAC Microprocessor (DuP) 208 and ISA/DAC Interface (IDI) 220 and their ISA Bus 108 addresses are described in FIG. 9, while the various bit assignments within the emulated registers are described in FIG. 10 and the commands responded to by the emulated floppy disk controller are described in FIG. 11.

Disk Emulator (DSK) 222 appears to DAC Bus 210, and thus to DAC Microprocessor (DuP) 208, as an 11 bit System 100 to Device Access Controller (DAC) 200 write data and register offset mailbox, an 8 bit Device Access Controller (DAC) 200 to System 100 register table, a 21 bit DMA (direct memory access) counter used to sequentially fetch or store floppy disk data, and a 10 bit direction and length counter register used to indicate the direction of data transfer, that is, to System 100 or to Device Access Controller (DAC) 200, and the length, that is, size or amount, of the floppy data to be transferred.

As will be described in further detail below, each floppy disk emulation operation by Device Access Controller (DAC) 200 is executed in three phases, referred to as the command phase, the execute phase and the result phase.

In the command phase, the command directing the operation to be performed and any parameters used in controlling the operation are loaded into the floppy disk emulator control logic, wherein the commands are selected from those identified in FIG. 11. At this time, System 100 must examine the RQM (Request Made) and DIO (Direct I/O) bits of the Main Status Register (MSR), described in FIGS. 9 and 10, to determine their respective states to determine if Device Access Controller (DAC) 200 is ready for the operation. In this regard, and referring to FIG. 10, RQM is set false after each write cycle and until a received byte indicating that the data has been successfully received has been received and processed. RQM is also deasserted after the last parameter byte controlling the operation has been received and the floppy disk emulator enters the next phase, as defined by the current operation command. The Command Busy bit (CD_BS) is also asserted, after the command byte has been accepted, and remains asserted until the end of the result phase.

In the execute phase, the floppy data is transferred to or from the emulated disk drive wherein each data byte is transferred across ISA Bus 108 by an Interrupt (INT) or a DRQ (DMA Request) as directed by the Specify command, although for non-DMA transfers the INT and RQM bits are set when the FIFO contains a threshold amount of read data words or can accept a threshold amount of write data words. In write operations, the data is written directly into Device Access Controller Memory (DACMEM) 218 as it becomes available from ISA Bus 108 and, in read operations, the data is sourced from Device Access Controller Memory (DACMEM) 218 and to ISA Bus 108 as ISA Bus 108 is ready to receive the data. Transfers are then terminated by a TC signal on ISA Bus 108 or on an overrun or underrun state and an end of track (EOT) signal, which are emulated by the termination of a Word Counter by DAC Microprocessor (DuP) 208, as described below.

Finally, the result phase ends the operation as is indicated by the generation of the INT signal, which is determined upon the reading of a defined set of result bits from the emulated disk drive. RQM and DIO are both asserted at this time, and, after the result bytes have been read, are set to their initial states while CD_BS is deasserted, thereby indicating that the floppy disk emulator is ready for the next operation.

Considering the functions of each of the above described components of Disk Emulator (DSK) 222 during a floppy disk operation, a set of System 100 to floppy disk write data and offset values are stored in the 11 bit mailbox register, referred to as FDMB (floppy disk mailbox), at the start of an operation and the loading of this register sets a Busy Flag, referred to as FDBSY (floppy disk busy), to Disk Emulator (DSK) 222. An Interrupt Enable Flag, referred to as FDIEN (floppy disk interrupt enable) is associated with FDBSY such that, if both are set, an interrupt to DAC Microprocessor (DuP) 208 to notify DAC Microprocessor (DuP) 208 that the operation is ready for execution is set, and is subsequently cleared by a read of the FDMB by DAC Microprocessor (DuP) 208. The floppy register table contained in Floppy Emulator 222, in turn, is an 8 bit wide by 8 deep register file maintained by DAC Microprocessor (DuP) 208 and emulates a disk drive register table to System 100, as represented in FIG. 9, for storing the information represented in FIG. 10.

The address counter and direction and length counter, in turn, respectively store a 26 bit address of the next location to be used in the execution phase of a transfer, a 1 bit value specifying whether the current transfer is to or from System 100, that is, to or from ISA Bus 108, and the number of remaining words to be transferred from or to Device Access Controller Memory (DACMEM) 218 in the transfer. In this regard, and upon a request for a write operation, Disk Emulator (DSK) 222 loads the address and direction and length counters to point of the region of Device Access Controller Memory (DACMEM) 218 where the transfer will take place after the current command has been interpreted. In a read operation, the loading of the address and direction and length counters is performed after Device Access Controller Memory (DACMEM) 218 is loaded with the target data.

The length counter is also used to terminate the execute phase of an operation, as an alternative to the TC signal, by setting a Floppy Disk Done (FDDONE) flag when the length counter reaches zero during a transfer wherein FDDONE, in association with FDIEN, will generate an interrupt to DAC Microprocessor (DuP) 208 to terminate the operation. It will be noted that FDDONE is also used during the result phase of an operation as conventional floppy disk operations require that System 100 be provided with status information at the end of an operation. In this regard, DAC Microprocessor (DuP) 208 will, at the completion of the execute phase and in the result phase, will initiate a second transfer of address and length as status information to System 100 and, upon receiving a second FDDONE indicating that the status information has been successfully transferred, will reset MSR RQM, DIO and CD_BS in preparation of the next command.

B. Video Emulation and Redirection (FIGS. 12, 13 and 14)

As has been previously described, Video Controller (VC) 226 and Video Memory (VMEM) 228 operate with Video Interface 230 to appear to System 100, that is, Processor Module (PM) 102, as a conventional Video Controller (VDC) 116, with the control registers of Video Controller (VC) 226 and the video buffers of Video Memory (VMEM) 228 being directly mapped onto ISA Bus 108 through Addressing and Shared Memory Interface (ASMI) 246 so that Video Controller (VC) 226 and Video Memory (VMEM) 228 appear to reside on ISA Bus 108. As also described, however, all System 100 video operations are mapped onto and executed on DAC Bus 210.

As has also been described, the control registers of Video Controller (VC) 226 and the video buffers maintained by Video Controller (VC) 226 in Video Memory (VMEM) 228 are mirrored in Device Access Controller Memory (DACMEM) 218 and all information written to the control registers of Video Controller (VC) 226, all video data written to Video Memory (VMEM) 228, and the addresses of such writes, are copied to Device Access Controller Memory (DACMEM) 218 after the completion of each write to Video Controller (VC) 226 and/or Video Memory (VMEM) 228. For this reason, DAC Microprocessor (DuP) 208 retains mastery of DAC Bus 210 at the end of each write to Video Controller (VC) 226 and/or Video Memory (VMEM) 228 and copies the video information written to Video Controller (VC) 226 and/or Video Memory, effectively as part of the same operation. In a like manner, the addresses, but only the addresses, of all reads from Video Controller (VC) 226 and/or Video Memory (VMEM) 228 are copied to Device Access Controller Memory (DACMEM) 218 at the end of each such read, again by DAC Microprocessor (DuP) 208 which again retains mastery of DAC Bus 210 after the completion of each read operation and again performs the copy operation effectively as part of the read operation.

In maintaining a valid representation of the current state of video information of System 100 in Remote System 202, Device Access Controller (DAC) 200 first obtains an initial "snapshot" of the operating state of Video Controller (VC) 226 and Video Memory (VMEM) 228 and the video and control information residing therein at system initialization. Thereafter, Device Access Controller (DAC) 200 passively traces, that is, sequentially records, all System 100 video write addresses, write data and read addresses in the manner described above as System 100 performs video operations, the initial "snapshot" and all subsequent trace information being maintained in a trace buffer in DAC Memory (DACMEM) 218 that is read through LAN Controller (LAC) 216 to Remote System 202.

The trace buffer in DAC Memory (DACMEM) 218 is implemented as a circular buffer managed such that, once set up by DAC Microprocessor (DuP) 208, continuous writes or reads of video information will be stored and wrapped in DAC Memory (DACMEM) 218 without further intervention until the information is redirected to Remote System 202 in the manner described above. Device Access Controller (DAC) 200 manages the trace buffer through a number of registers that may be implemented in the registers of DAC Microprocessor (DuP) 208 or in DAC Memory (DACMEM) 218. These trace buffer management registers include a video buffer start register for storing an address specifying the location in DAC Memory (DACMEM) 218 of the first location of the circular trace buffer wherein video traces will be stored, a video buffer stop register for storing an address specifying the location in DAC Memory (DACMEM) 218 of the last location in the circular trace buffer for storing video trace information, and a video current pointer register for storing a count specifying the address in DAC Memory (DACMEM) 218 of the next location in the circular trace buffer for storing video trace information. In this regard, when the address stored in the video current pointer register reaches the address stored in the video buffer stop register, the video current pointer register is loaded with the address stored in the video buffer start register, thereby implementing the wrapping mechanism of the circular trace buffer.

Finally, the trace buffer management registers include a video trip point register for storing an value or address in DAC Memory (DACMEM) 218, referred to as V_TRIP, of a location in the circular trace buffer at which DAC Microprocessor (DuP) 208 is to be interrupted to perform a write to LAN Controller (LAC) 216, thereby avoiding the overwriting of video trace data. When the address stored in the video current pointer register equals the address stored in the video trip point register, that is, V_TRIP, a V_INT (video interrupt) flag will be set and, if an associated controllable interrupt flag referred to as VTIEN (video transfer enable) is also set, the interrupt to DAC Microprocessor (DuP) 208 is also set.

Lastly, it is apparent that certain information will be associated with each transfer of video information between System 100 and Device Access Controller (DAC) 200's video emulation and that it will be necessary to store this information and to subsequently provide this information to Remote System 202 to fully describe each transfer to Remote System 202. This information will include Read/Write information characterizing whether the transfer was a read or write of video information by System 110, Byte/Word information indicating whether the transfer was of a byte or a word of video information, IO/Memory information indicating whether the transfer was of video data, and Address information representing the Video Controller (VC) 226 register or Video Memory (VMEM) 228 location written to or read from. This information is stored in DAC Memory (DACMEM) 218 and transferred to Remote System 202 as a group of one to three bytes of information as represented in FIGS. 12, 13 and 14.

C. Keyboard/Mouse Redirection (FIGS. 15 and 16)

As has been described in the preceding discussion of keyboard/mouse redirection, Device Access Controller (DAC) 200 provides keyboard and mouse inputs to System 100 from Remote System 202 through the network and LAN Controller (LAC) 216, with the output of Keyboard/Mouse Interface (KMI) 224 being provided to a Keyboard/Mouse Controller (K/MC) 118 as sideband signals. As represented in FIG. 8, Device Access Controller (DAC) 200 provides two such auxiliary port interfaces to System 100, one for keyboard data and clock and the second for mouse data and clock, with transfers between these ports and Keyboard/Mouse Controller (K/MC) 118 being handled by Keyboard/Mouse Interface (KMI) 224 and Device Access Controller (DAC) 200 as an interrupt/poll driven interface.

Device Access Controller (DAC) 200 maintains a set of registers, or buffers, for storing the keyboard and mouse data transferred to System 100 and for storing the responses received from System 100 and a set of flags for controlling the flow of data between Device Access Controller (DAC) 200 and System 100, wherein these registers and flags are summarized in FIGS. 15 and 16.

In the instance of a System 100 to Device Access Controller (DAC) 200 data transfer, the data is received from System 100 and stored in the corresponding Host Buffer register (HBUFn) when the corresponding Host Buffer Ready Flag (HBRDYn) is set, whereupon the data received from System 100 will be tested for parity and for a valid Stop bit. If there has been an invalid transfer, the data will be discarded, forcing a Resent command to be sent from Device Access Controller (DAC) 200 to System 100, consequently forcing a retransmittal of the data from System 100 to Device Access Controller (DAC) 200.

If the instance of a Device Access Controller (DAC) 200 to System 100 data transfer, the data is loaded into the corresponding Data Buffer (DBUFn) by DAC Microprocessor (DuP) 208 and the corresponding Data Buffer Ready (DBRDYn) is reset. The data and a parity bit are then transferred to System 100 and DBRDYn and an associated DAC Microprocessor (DuP) 208 interrupt enable flag (DBIEN) are set, thereby interrupting DAC Microprocessor (DuP) 208, until System 100 responds by writing a response into the respective DBUFn register in acknowledgment of receipt of valid data.

D. Serial Data Redirection (FIGS. 17, 18, 19 and 20)

As has been described above, ISA/DAC Interface (IDI) 220 includes a Serial Input/Output Emulator (SIO) 232 connected from the Processor Module (PM) 102 bus that Device Access Controller (DAC) 200 is connected from, either an ISA Bus 108 or a Local Bus 110, and Device Access Controller (DAC) 200, operating through Serial I/O Emulator (SIO) 232, provides a virtual input/output port supporting 8 and 16 bit serial data transfers in emulation of a conventional personal computer type COM1 or COM 2 port.

In a present implementation of Device Access Controller (DAC) 200, Device Access Controller (DAC) 200 emulates a Texas Instruments TI 16550A serial port and accordingly appears to System 100, that is, to ISA Bus 108, as several control and status registers and a transmit and receive FIFO (first-in/first-out) memory. The control and status registers emulated by Serial I/O Emulator (SIO) 232 in this emulation are represented in FIG. 17, which identifies the control and status registers and the bit assignments within the control and status registers using the nomenclature and designations used in the Texas Instruments documentation relevant to the TI 16550A, such as ?. System 100 monitors and controls Serial I/O Emulator (SIO) 232 through the registers illustrated in FIG. 17 in the manner well understood in the relevant arts and in the industry, with all data transfers being interrupt or poll driven as specified by the ERB and THRE bits of the IER and LSR registers, respectively.

The transmit/receive buffer also appears to System 100 as a conventional TI 16550A data transmit and receive buffer, conventionally referred to as RX_Buf. For example, in data transfers to System 100, that is, when a Receive Word is available, the DR bit of the LSR register is set and, when the number of Receive Words exceeds the Receiver FIFO level, as illustrated in FIG. 18, an interrupt is generated on ISA Bus 108 and he data is transferred to System 100 by a read of the RX_Buf register. When data is transmitted by System 100, the THRE bit will be set when there is room in the transmit buffer to receive the data and, if the ETBEI bit is also set, an interrupt will be generated to System 100 by Serial I/O Emulator (SIO) 232 and the data will be transferred from System 100 and to Device Access Controller (DAC) 200 by a write to the RX_Buf register.

Serial I/O Emulator (SIO) 232 appears to Device Access Controller (DAC) 200, that is, to DAC Bus 208 and DAC Microprocessor (DuP) 208, as an 11 bit System 100 to Device Access Controller (DAC) 200 write data and register offset mailbox, an 8 bit Device Access Controller (DAC) 200 to System 100 register table, a 21 bit serial DMA (Direct Memory Access) counter used to sequentially fetch serial read data, and a 16 bit serial DMA length counter to track the remaining read words to be fetched during a data transfer. Serial I/O Emulator (SIO) 232 also provides a number of registers and flags for use by Device Access Controller (DAC) 200 in performing serial data I/O operations, as represented according to the usual conventions in FIGS. 19 and 20.

Considering the uses of each of these elements, Serial I/O Emulator (SIO) 232, operating under control of DAC Microprocessor (DuP) 208, receives all System 100 to Serial I/O Emulator (SIO) 232 write data and register offset values from System 100 and stores these values in the 11 bit mailbox register, identified as SD_MB. Loading of this register sets a Busy flag, identified as SDBSY, and an Interrupt Enable flag, identified as SDIEN, is associated with SDBSY such that if both flags are set Serial I/O Emulator (SIO) 232 sets an interrupt to DAC Microprocessor (DuP) 208. The SDBSY flag is cleared upon a read of SD_MB by DAC Microprocessor (DuP) 208, with all System 100 to Device Access Controller (DAC) 200 transfers being suspended until SDBSY is cleared, to prevent overwrites and failures of register updates.

The serial register table is maintained by DAC Microprocessor (DuP) 208 and is used to store information regarding register writes, and the interpretations of information written into the registers, as well as to maintain data transfer status. The serial DMA address counter is used to specify where in Device Access Controller Memory (DACMEM) 218 a next serial receive data word is located, while the serial DMA length counter is used as a down counter to specify the number of receive data words to transfer from Device Access Controller Memory (DACMEM) 218.

In the event of a data write by System 100 the data is written into Serial I/O Emulator (SIO) 232's FIFO by System 100 in the manner described above while, and is subsequently read from the FIFO and written into Device Access Controller Memory (DACMEM) 218 for transmittal to the eventual destination, for example, through LAN Controller (LAC) 216. In the event of data to be read to System 100, the data is received by Device Access Controller (DAC) 200, for example, through LAN Controller (LAC) 216, and is written into Device Access Controller Memory (DACMEM) 218 to be subsequently transferred into Serial I/O Emulator (SIO) 232's FIFO for transfer to System 100.

In either event, LAN Controller (LAC) 216 or Serial I/O Emulator (SIO) 232 will load the information necessary to control the transfer of data into, for example, the mailbox and register table and will generate a corresponding interrupt to DAC Microprocessor (DuP) 208, which will load the serial DMA address counter and serial DMA length counter with the appropriate values pointing to the serial data buffer in Device Access Controller Memory (DACMEM) 218. A DAC Microprocessor (DuP) 208 interrupt will be generated as a result of the serial DMA length counter being greater than zero and DAC Microprocessor (DuP) 208 will respond by executing the required reads from Device Access Controller Memory (DACMEM) 218 to Serial I/O Emulator (SIO) 232's FIFO or writes from Serial I/O Emulator (SIO) 232's FIFO to Device Access Controller Memory (DACMEM) 218. DAC Microprocessor (DuP) 208 will increment the serial DMA address counter and decrement the serial DMA length counter as each word is transferred, until the serial DMA length counter reaches zero, at which point a Serial Data Done flag, identified as SDDONE, is set and, if an associated Serial Data Interrupt Enable flag, identified as SDNIEN, is set, an interrupt to DAC Microprocessor (DuP) 208 is set, thereby terminating the operation.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. In a first computer system including a processor for performing operations on data and a memory for storing the data, the results of operations on the data and programs for directing the operations of the processor, and a first system bus interconnecting the processor and the memory for transferring data and program instructions therebetween, a device access controller for transferring virtual inputs and outputs representing operations of the first system between the first system and a second system, the device access controller comprising:

a video controller for performing video display operations, a video memory connected from the video controller for storing video data representing operations of the first system, a network controller connected to the second system by a network for transferring information between the first system and the second system, a controller processor for controlling operations of the device access controller, a device access controller bus interconnecting the video controller, the network controller and the processor, and a video interface connected between the first system bus and the device access controller bus and responsive to a first system video data write operation on the first system bus for receiving video information including video data and video write addresses from the first system bus and indicating the first system video write operation to the controller processor, the controller processor being responsive to the indication of the first system video write operation for directing the video controller to write the received video data write addresses into video controller registers and the video data into the video memory at the video write addresses, and the network controller being responsive to the writing of video data into the video memory for reading the video information including the video data from the video memory and the video data write addresses from the video controller registers and transmitting the video information including the video data and the video data write addresses to the second system.

2. The device access controller of claim 1, wherein:

the video interface is responsive to a first system video data read operation on the first system bus for receiving video information including the video data read addresses from the first system bus and indicating the first system video data read operation to the controller processor, the controller processor being responsive to the indication of the first system video data read operation for directing the video controller to write the received video data read addresses into the video controller registers, and the network controller being responsive to the writing of video data read addresses into the video controller registers for reading the video information including the data read addresses from the video controller registers and transmitting the video information including the video data read addresses to the second system.

3. The device access controller of claim 1 wherein the network controller transmits information to the second system in network packets.

4. The device access controller of claim 3, further comprising:

a device access controller memory connected from the device access controller bus, wherein
the network controller reads the video information into the device access controller memory, formats the video information in the device access controller memory into network packets stored therein, and transmits the network packets to the second system.

5. The device access controller of claim 1, further comprising:

a keyboard interface connected to the device access controller bus and to a keyboard controller of the first system, wherein the network controller is responsive to keyboard information received from the second system for indicating to the controller processor the receipt of information from the second system, the controller processor is responsive to the received keyboard information for directing the network controller to write the keyboard information to the keyboard interface, and the keyboard interface is responsive to the keyboard information received from the network controller for providing the keyboard information to the keyboard controller of the first system to appear as keyboard information received directly by the first system from a local keyboard.

6. The device access controller of claim 5, further comprising:

an address mapping interface connected between the controller processor and the keyboard interface for mapping between first system addresses appearing on the first system bus and device access controller bus addresses.

7. The device access controller of claim 1, further comprising:

a disk interface connected between the first system bus and the device access controller bus and responsive to a first system disk write operation on the first system bus for receiving first disk information including disk data and disk write addresses from the first system bus and indicating the first system disk write operation to the controller processor, the controller processor being responsive to the indication of the first system disk write operation for
writing the first disk information into a device access controller memory, and directing the network controller to read the first disk information from the device access controller memory and transmit the first disk information to the second system.

8. The device access controller of claim 7, wherein:

the disk interface is responsive to a first system disk read operation on the first system bus for receiving second disk information including disk read addresses from the first system bus and indicating the first system disk read operation to the controller processor, the controller processor is responsive to the indication of the first system disk read operation for
writing the second disk information into a device access controller memory, and directing the network controller to read the second disk information from the device access controller memory and transmit the second disk information to the second system, the second system is responsive to the disk read addresses for transmitting third disk information including the disk data corresponding to the disk read addresses to the network controller, the network controller is responsive to the third disk information received from the second system for indicating the receipt of the third disk information, the controller processor is responsive to the indication of receipt of the third disk information for
directing the network controller to provide the third disk information to the disk interface and directing the disk interface to provide the third disk information to the first system.

9. The device access controller of claim 7, further comprising:

an address mapping interface connected between the controller processor and the disk interface for mapping between first system addresses appearing on the first system bus and device access controller bus addresses.

10. The device access controller of claim 1, further comprising:

an address mapping interface connected between the controller processor and the video interface for mapping between first system addresses appearing on the first system bus and device access controller bus addresses.

11. The device access controller of claim 1, further comprising:

an interrupt mapping interface connected between the controller processor and the first system bus for mapping between interrupts appearing on the first system bus and the device access controller bus.

* * * * *